(12) United States Patent
de Marco et al.

(10) Patent No.: US 11,121,541 B2
(45) Date of Patent: Sep. 14, 2021

(54) SOLUTION TO SAFELY PROTECT A BOOST CONVERTER FROM A SHORT CIRCUIT TO GROUND

(71) Applicant: Dialog Semiconductor (UK) Limited, London (GB)

(72) Inventors: Louis de Marco, Swindon (GB); Nicusor Bortun, Graz (AT); Giovanni Tarroboiro, Bientina (IT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/287,287

(22) Filed: Feb. 27, 2019

(65) Prior Publication Data
US 2020/0274446 A1 Aug. 27, 2020

(51) Int. Cl.
*H02H 7/12* (2006.01)
*H02M 3/155* (2006.01)

(52) U.S. Cl.
CPC .......... *H02H 7/1213* (2013.01); *H02M 3/155* (2013.01)

(58) Field of Classification Search
CPC ........... H02H 7/10; H02H 7/12; H02H 7/1213
See application file for complete search history.

(56) References Cited

U.S. PATENT DOCUMENTS

| 5,321,348 A | 6/1994 | Vinciarelli et al. |
| 8,018,694 B1 | 9/2011 | Wu |
| 2007/0108915 A1* | 5/2007 | Ribarich ............ H05B 41/2981 315/247 |
| 2010/0026257 A1* | 2/2010 | Huang .................. H02M 3/158 323/282 |
| 2010/0123978 A1 | 5/2010 | Lin et al. |
| 2017/0194858 A1* | 7/2017 | Villot .................. H02M 3/1588 |
| 2017/0288545 A1* | 10/2017 | Yamada ................ H02M 3/158 |
| 2018/0323712 A1* | 11/2018 | Traube .................... H02P 7/291 |
| 2018/0342944 A1* | 11/2018 | Chiereghin ............ H02M 1/08 |

* cited by examiner

*Primary Examiner* — Peter M Novak
(74) *Attorney, Agent, or Firm* — Saile Ackerman LLC; Stephen B. Ackerman

(57) ABSTRACT

A Boost DC-DC switching converter, having a safety protection method for a short circuit to ground during normal Boost operations, is described. A short circuit protection mechanism, to be used at startup, is also described. A low current capability active clamp is activated, during a soft or hard short circuit condition, and an isolation switch is turned off. An input of the switching converter is isolated from an output of the switching converter, and the Boost switching converter is able to safely discharge high energy stored in its coil, with no external components and minimum extra silicon area.

25 Claims, 7 Drawing Sheets

SOLUTION TO SAFELY PROTECT A BOOST CONVERTER FROM A SHORT CIRCUIT TO GROUND

BACKGROUND

Field

The present disclosure relates generally to a DC-DC switching converter, and more specifically to isolating a Boost switching converter input from its output, protecting the Boost switching converter from a short circuit condition at the output.

Background

Of the basic DC-DC switching converter topologies, the Boost switching converter is unique in that it doesn't offer a natural isolation between its input and output.

FIG. 1 illustrates 100, a circuit diagram during a short circuit condition, for a prior art Boost switching converter, where the output cannot be pulled below the input (Vin minus a diode voltage) without charging coil L. FIG. 1 also shows that true shutdown is not achievable with a conventional Boost converter, due to the conducting path between the input Vin and the output Vboost, which cannot be disabled. For this reason, there is an increasing demand from the industry to implement an additional passive element to isolate output Vboost from input Vin, in order to be able to discharge the switching converter output to ground, when the Boost converter is disabled. The disable process of disconnecting Vin from Vboost can be controlled, but there is no way of knowing whether there is residual energy stored in the coil, the moment the path to the output capacitor Cout is interrupted. In this case, the coil can act like an ideal current source, forcing current to flow into a high impedance path. This causes the voltage at node LX to increase rapidly, until the breakdown of the Low Side and isolation devices occurs. This is even more valid if the disconnection happens upon detecting a short circuit at the output, and the energy in the coil has built up to high values that need to be safely dissipated.

A safety mechanism to discharge the current in coil L must therefore be provided.

SUMMARY

FIG. 1. depicts an asynchronous Boost converter but the considerations made so far and hereafter are equally valid for asynchronous control (where the High Side is a passive diode device) and synchronous control (where the High Side is implemented as a switch acting as active diode).

Accordingly, it is an object of one or more embodiments of the present disclosure to provide a Boost DC-DC switching converter having a safety protection method for a short circuit to ground during normal Boost operations.

It is a further object of one or more embodiments of the disclosure to provide a short circuit protection mechanism to be used at startup in the Boost switching converter.

Still further, it is an object of one or more embodiments of the disclosure to provide a Boost switching converter that is able to safely discharge high energy stored in the coil, with no additional external components and minimum extra silicon area.

Other objects will appear hereinafter.

The above and other objects of the present disclosure may be accomplished in the following manner. A safety protection circuit, for a short circuit to ground, in a Boost DC-DC switching converter is disclosed, comprising an inductor, a high side device, and a low side device, where the inductor is connected at a common node to the high side and low side devices. The safety protection circuit comprises a gm amplifier, configured to drive a gate of the low side device, an active clamp connected between the inductor and the gm amplifier, and short circuit detection logic, configured to activate the active clamp when a short circuit is detected. The safety protection circuit is configured to route excess current from the inductor through the low side device during the short circuit condition.

The above and other objects of the present disclosure may be further accomplished by a safety protection method for a short circuit to ground, in a Boost DC-DC switching converter. The steps include detecting a short circuit condition. The steps also include activating an active clamp connected at an output of an inductor. The steps also include isolating the output from an input of the Boost DC-DC switching converter. The steps also include routing excess current from the inductor through a low side device.

In various embodiments the function may be used for protecting a Boost DC-DC switching converter during normal operations.

In various embodiments the function may be used for protecting a Boost DC-DC switching converter during startup.

In various embodiments the function may be used for safely disconnecting the input voltage from the output voltage at shutdown, and dissipate any residual energy that might be stored in the coil.

In various embodiments the function may be used for asynchronous control or synchronous control.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

When there is a short circuit to ground at the output of a Boost switching converter, current can build up in the coil exceeding the saturation limit. This can lead to the coil being damaged, and the high level of energy stored in the coil can damage the integrated circuit, of which the boost converter is a part, and possibly other parts of the system. A mechanism to recognize the short circuit condition in the Boost switching converter, and a means to isolate the input from the output, is therefore necessary. But in the case of a short circuit, it's even more vital to make sure that the energy built up in the coil is safely discharged, because in the time needed by the system to detect the short circuit and isolate the input from the output, the current in the coil can reach very high levels. Therefore there is a need not only to disconnect the input voltage Vin from the output voltage Vout, but also to handle the high level of power in the discharging of the coil of the Boost switching converter.

The present disclosure provides a safety protection circuit and method for dealing with a short circuit to ground, in a Boost DC-DC switching converter, that discharges high energy stored in the coil, with no extra external components and minimum extra silicon area.

Figure 1:
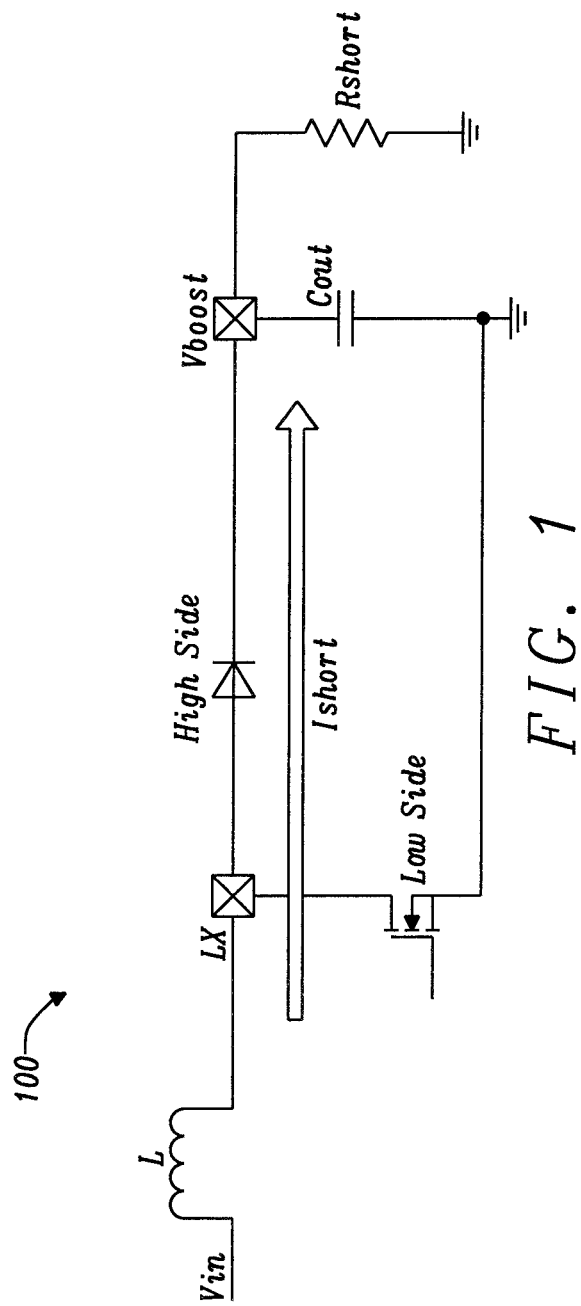
FIG. 1 illustrates a circuit diagram during a short circuit condition, for a prior art Boost switching converter.
Figure 2:
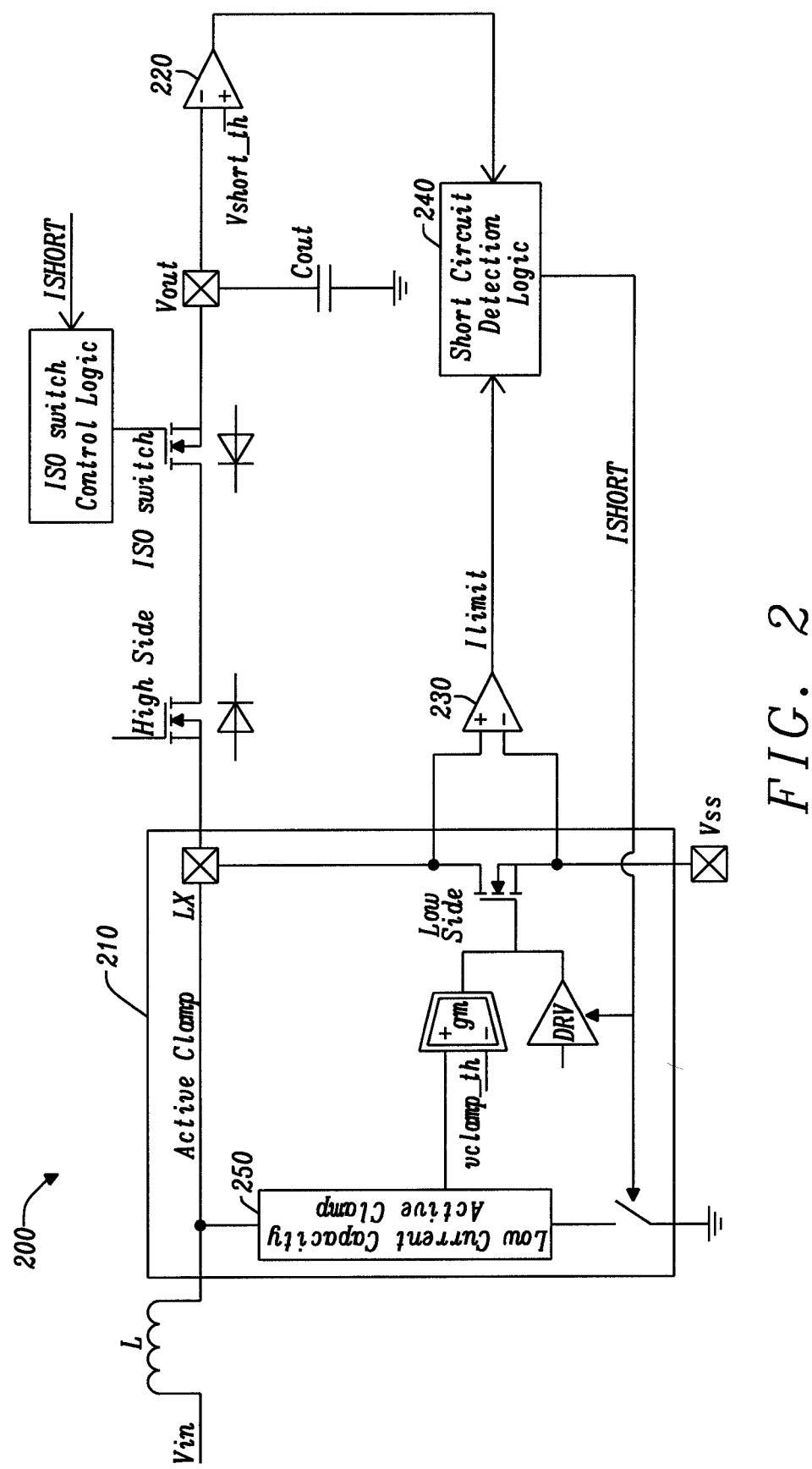
FIG. 2 shows a short circuit protection circuit for a Boost switching converter, using the Low Side Pass Device sized to handle high power, during normal Boost converter operations.

FIG. 2 shows 200, a short circuit protection circuit for a Boost switching converter, using the Low Side Pass Device sized to handle high power during normal Boost converter operations. Isolation ISO switch allows the input of the switching converter Vin to be isolated from the output of the switching converter Vout. In this case ISO switch is an integrated MOSFET, and if a short condition is detected, ISO switch is turned off, cutting off the current's path.

Important aspects of the disclosure are the use of Active Clamp 210, which is initialized by Ishort after a short circuit is detected, where the short circuit condition at the output can be either a "hard" or "soft" short, in relation to the current capability of the shorted output.

A hard short is a condition where Vout collapses relatively quickly below Vin. A soft short is a condition where Vout drops below a regulation target, though remains above Vin, and the system switches at maximum duty cycle, so that at every switching cycle the current limit triggers.

Comparator 230 senses the current through the Low Side device, to determine when the current exceeds the current limit, which is signaled by Ilimit. The conditions for the detection of the short circuit can be programmable, depending on whether a hard short or a soft short is detected. For the case of a hard short, the Ilimit condition is ignored and Vshort_th=Vin, so that if Vout drops below Vin, the short is detected (Short Circuit Detection Logic block 240 sets Ishort=1 only if VOUT falls below VDD). For the case of a soft short, Vshort_th is chosen to be Vin<Vshort_th<Vout and Short Circuit Detection Logic block 240 sets Ishort to one if Vout<Vshort_th AND Ilimit=1 (The Short Circuit Detection Logic can be programmed to either assert the short circuit at the first flag of Ilimit or to wait for a certain number of cycle-to-cycle current limit events before setting Ishort=1). Both hard and short circuit conditions result in turning off the ISO Switch through the ISO switch Control Logic block and activating the active clamp.

Voltage sense of output voltage Vout is compared to threshold voltage Vshort_th in comparator 220, outputting a signal to Short Circuit Detection Logic block 240. Active Clamp 210 has the ability to handle high power as described below. Ishort, the condition that signals the presence of a short circuit condition at Vout, is output from Short Circuit Detection Logic block 240 and is configurable with Ilimit and comparator 220 output.

Figures 3A, 3B:
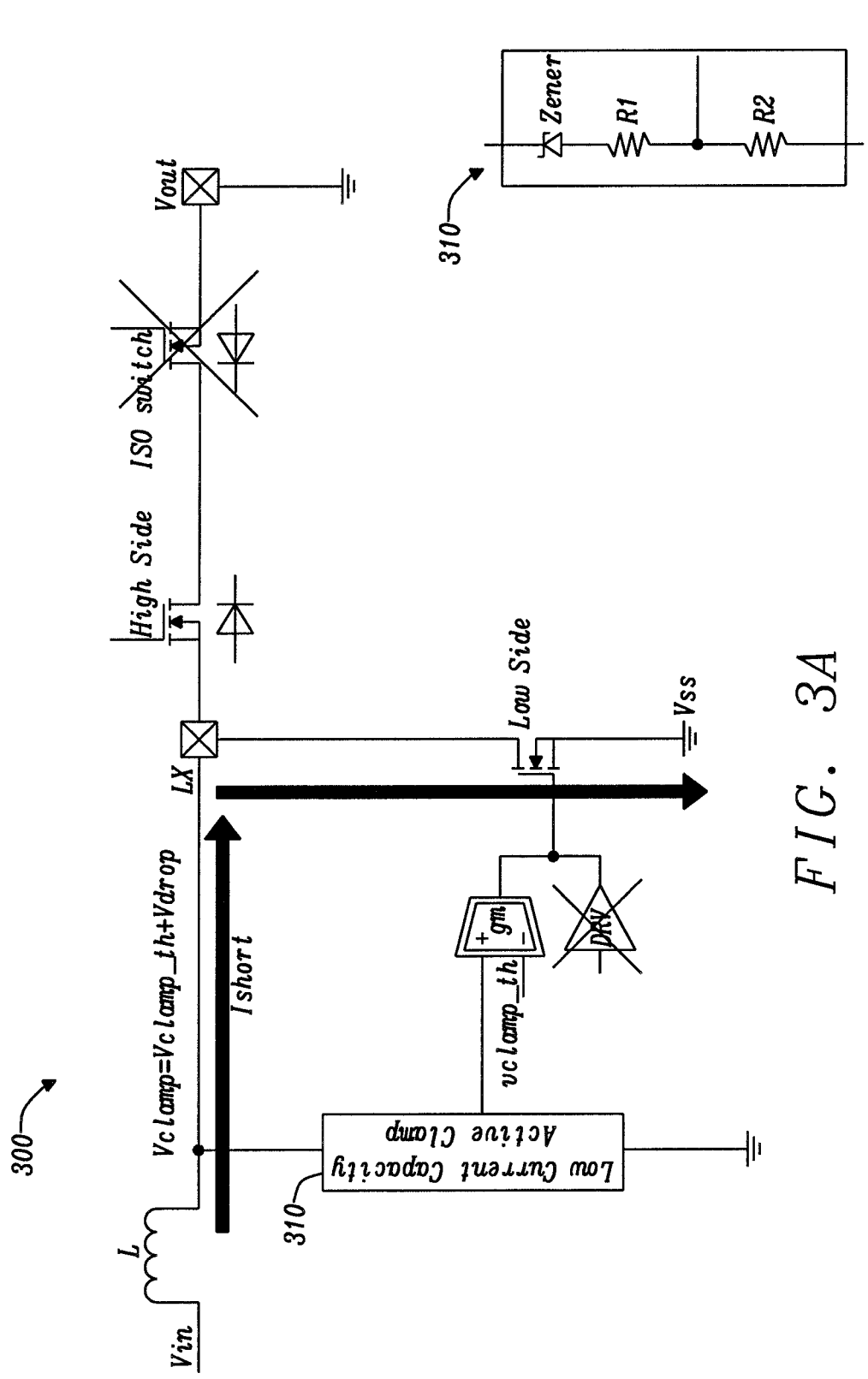
FIG. 3A illustrates a short circuit protection mechanism, used in the Boost switching converter of the present disclosure.
FIG. 3B illustrates one implementation of the active clamp of FIG. 3A.

FIG. 3A illustrates 300, a short circuit protection mechanism, used in the Boost switching converter of the present disclosure. Once Ishort is asserted and ISO switch is off, coil L will keep pushing current it has built up in the same direction it was flowing, to the output of the switching converter. As a consequence, node LX will rise rapidly, activating Low Current Capability Active Clamp (LCAC). The clamp has insufficient current capability to be alone able to clamp the voltage and discharge the coil current to ground. Active Clamp 310, between the high side device and the Low Side switch, is initiated by signal Ishort indicating a soft or hard short circuit condition, as is driver DRV, at the gate of the Low Side device, which enters a tri-state condition.

FIG. 3B illustrates one implementation of the Active Clamp 310 of FIG. 3A. The active clamp of FIG. 3B comprises a zener diode and 2 resistors, where one end of the zener diode is connected to node LX, and the other end is connected to resistor R1. Resistor R2 is connected between R1, at the positive input to the gm-amplifier, and ground. Other clamp designs, as known in the art, are also possible.

As the LX voltage reaches the activation voltage of LCAC, current will start flowing in the path through the Zener diode to ground. The LCAC will generate a Vdrop voltage, due to the physical behaviour of the Zener diode. The voltage across the Zener diode increases in the reverse-biased direction, such that the diode enters breakdown operation, where current starts flowing and the voltage across the Zener diode is fairly stable (around 5-6V).

The moment the current starts flowing through the Zener diode, a voltage appears at the positive input of the gm-amplifier. If the node LX increases such that the input of the gm-amplifier goes above the threshold, the output of the gm-amplifier will increase the gate voltage of the Low Side device, which will then sink the exceeding current that was causing the LX voltage to increase. A control loop exists, where the gate of the Low Side device is determined at just the exact value when the inputs of the gm-amplifier are the same voltage, keeping node LX at a maximum. The control loop will then act to drive the gate of the Low Side device, such that the LX voltage is clamped to voltage Vclamp=Vclamp_th+Vdrop, where Vclamp_th is the threshold voltage on the negative input to the gm-amplifier, and is chosen to guarantee that the Vclamp voltage doesn't exceed the safe operating area (SOA) of the device. In this way, the current in coil L can be safely discharged to ground through the Low Side, effectively providing the additional current capability the LCAC can't provide.

With the mechanism of the present disclosure, the high energy built up in coil L during the time needed to detect Ishort, and to turn the ISO switch off, is handled by the Low Side device, with no need of external components and very small extra silicon area. The voltage at which the LX node is clamped is chosen to be within the SOA of the Low Side device or ISO switch, whichever is smaller. The final voltage Vclamp, at which the LX node is clamped while the current is discharged, is the voltage seen across the Low Side device and the isolation switch. It needs to be chosen within the SOA of both the Low side device and the isolation switch, since the devices have a maximum drain-source voltage, before performance degradation. In normal Boost switching converter operation, Ishort=0 and the active clamp is disabled.

The driver DRV in FIG. 2 and FIG. 3A, in normal operations, pulls the gate of the Low Side to the supply or to ground, when the devices switch between on and off phase. When a short is detected, the driver is tri-stated so that the output of the gm-amplifier is free to drive the gate of the Low Side, without conflict from the driver pulling the gate of the switch to either the supply or to ground.

Figure 4:
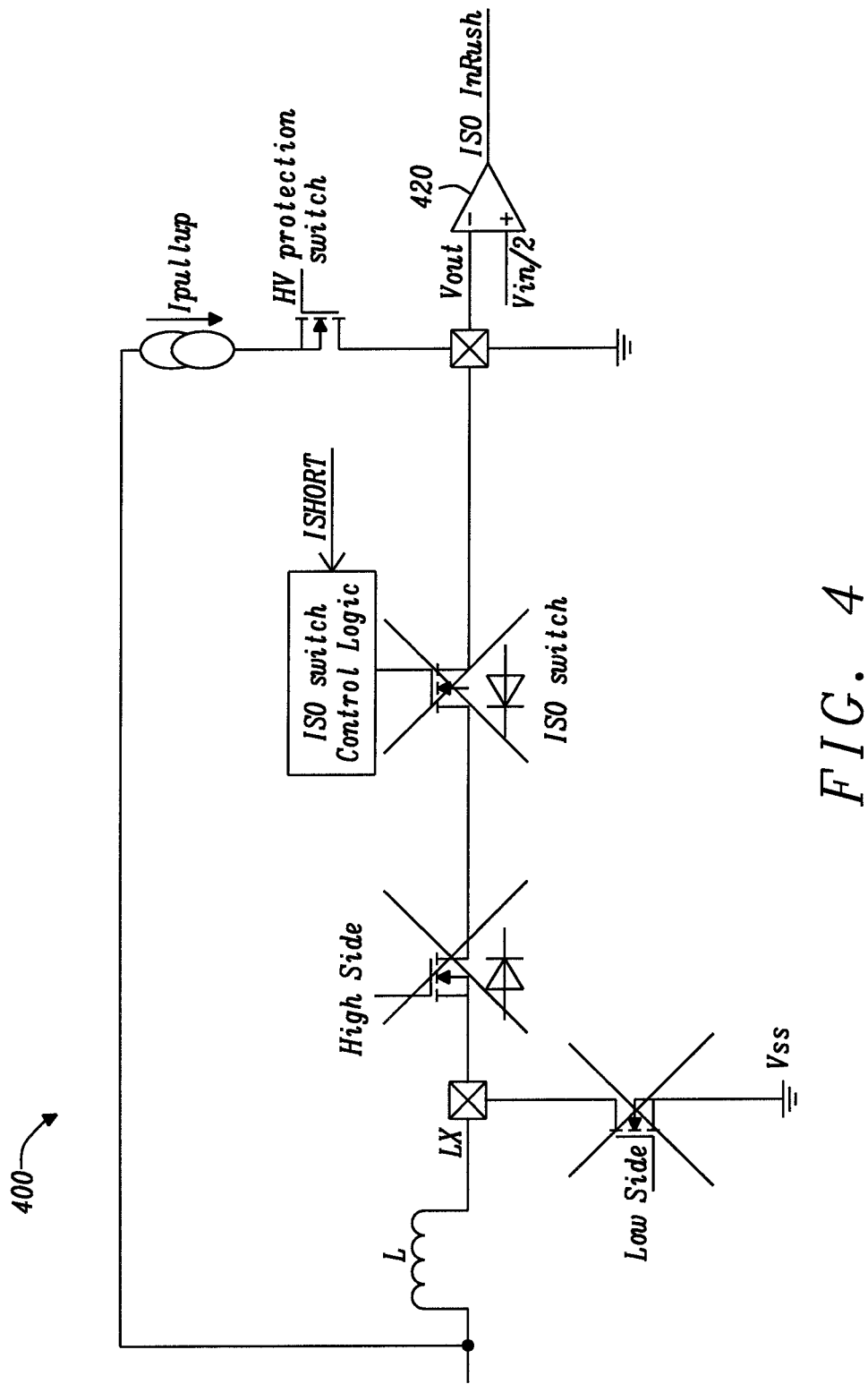
FIG. 4 shows a short circuit protection mechanism, used at startup in the Boost switching converter of the present disclosure.

FIG. 4 shows 400, a short circuit protection mechanism, used at startup in the Boost switching converter of the present disclosure. Under normal conditions, the startup of a Boost converter implementing an isolation switch is completed in two phases. As enable en is set to 1 VOUT will start from a 0 voltage condition, so the ISO switch needs to turn on slowly, to control the InRush current from the converter input voltage to the output capacitor, while VOUT is being connected and therefore charged to Vin. InRush control is known in the art and can be implemented in various ways. Only once VOUT has reached Vin, the startup sequence may continue to bring Vout to the final target voltage (>Vin). But if a short is present at startup (eg Vout is grounded) the condition Vout=Vin will never be reached, and the ISO switch turning on will cause the LX (terminal of the coil) to be shorted to ground. In this situation, nothing will prevent the current in the coil from exceeding the safety level. To avoid this condition, an additional first step is added to the startup sequence, pulling Vout up with programmable constant current Ipullup, before the ISO switch is turned on. As first step of the startup sequence while Ipullup is activated, Vout on the negative input of comparator 420 is compared to a threshold voltage, for example Vin/2 on the positive input, which can be implemented with a simple Schmitt Trigger circuit.

If there is no short at startup, Ipullup will be able to charge the output capacitance. As Vout crosses Vin/2, the signal ISO_Inrush triggers the absence of a short condition at startup, and the beginning of the Inrush phase occurs, for turning on the ISO switch in a controlled way. Input voltage Vin, as well as Vin/2, are at a constant voltage. The HV protection switch is connected between constant current source Ipullup and output voltage Vout to protect the low voltage circuitry from the high voltage value reached by Vout. The value chosen for the programmable constant current for Ipullup is done in relation to output capacitor Cout, and is based on a predetermined time for output voltage Vout to reach Vin/2, as described below.

Figure 5:
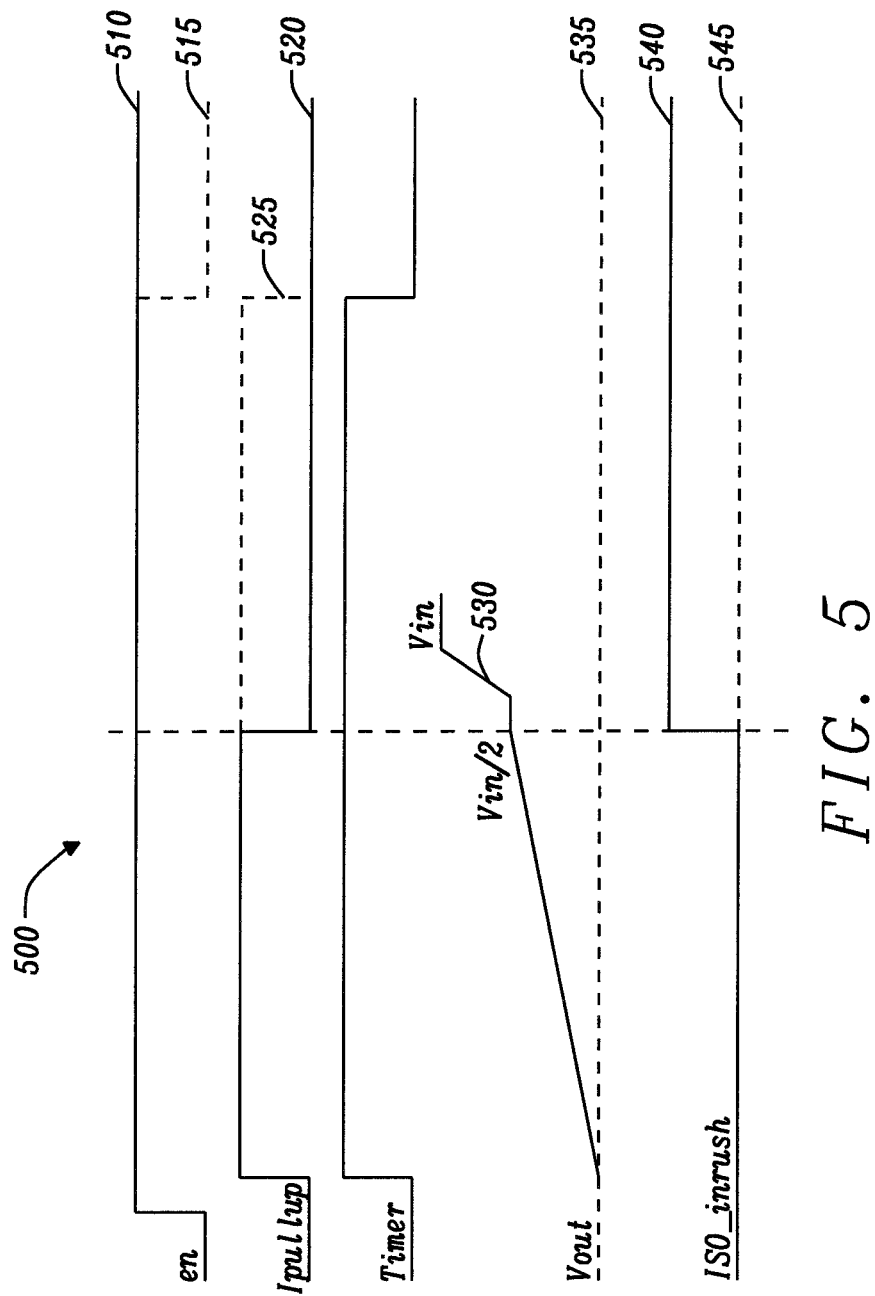
FIG. 5 illustrates a timing diagram for the short circuit protection mechanism of FIG. 4, used during startup in the Boost switching converter of the present disclosure.

FIG. 5 500 illustrates a timing diagram for the short circuit safety mechanism of FIG. 4, used during startup of the present disclosure. Enable en 510 is asserted, after which constant current Ipullup 520 is activated, and Timer is started. If no short circuit condition exists, Vout 530 starts rising with a slope determined by Ipullup/Cout. If Vout reaches the threshold Vin/2 before the timer has expired, Ipullup is disabled and ISO_inrush 540 is set to 1, which signals that the ISO switch can be turned on with its own built-in Inrush control, so that Vout reaches Vin in a controlled way. After Vout has reached Vin, the startup sequence can be completed, by ramping up Vout to the final target voltage through a soft startup, as is known in the art. Note that the Active Clamp of the disclosure works only after the startup procedure has completed, and doesn't need to work before that. The protection at startup consists simply of activating Ipullup before turning on the ISO switch, as a way to test that a short is not already present, as the Boost converter is enabled.

Timer can be defined such that if Vout hasn't reached the threshold by the time Timer has expired, Vout is grounded such that a short circuit condition at startup is flagged, and startup of the Boost switching converter is interrupted. A short circuit during startup is represented by en 515 and Ipullup 525 going low, when Timer has expired, while Vout 535 and ISO_inrush 545 remain low. Note that the ISO switch Control Logic block 240 turns the ISO switch off if Ishort=1.

Figure 6:
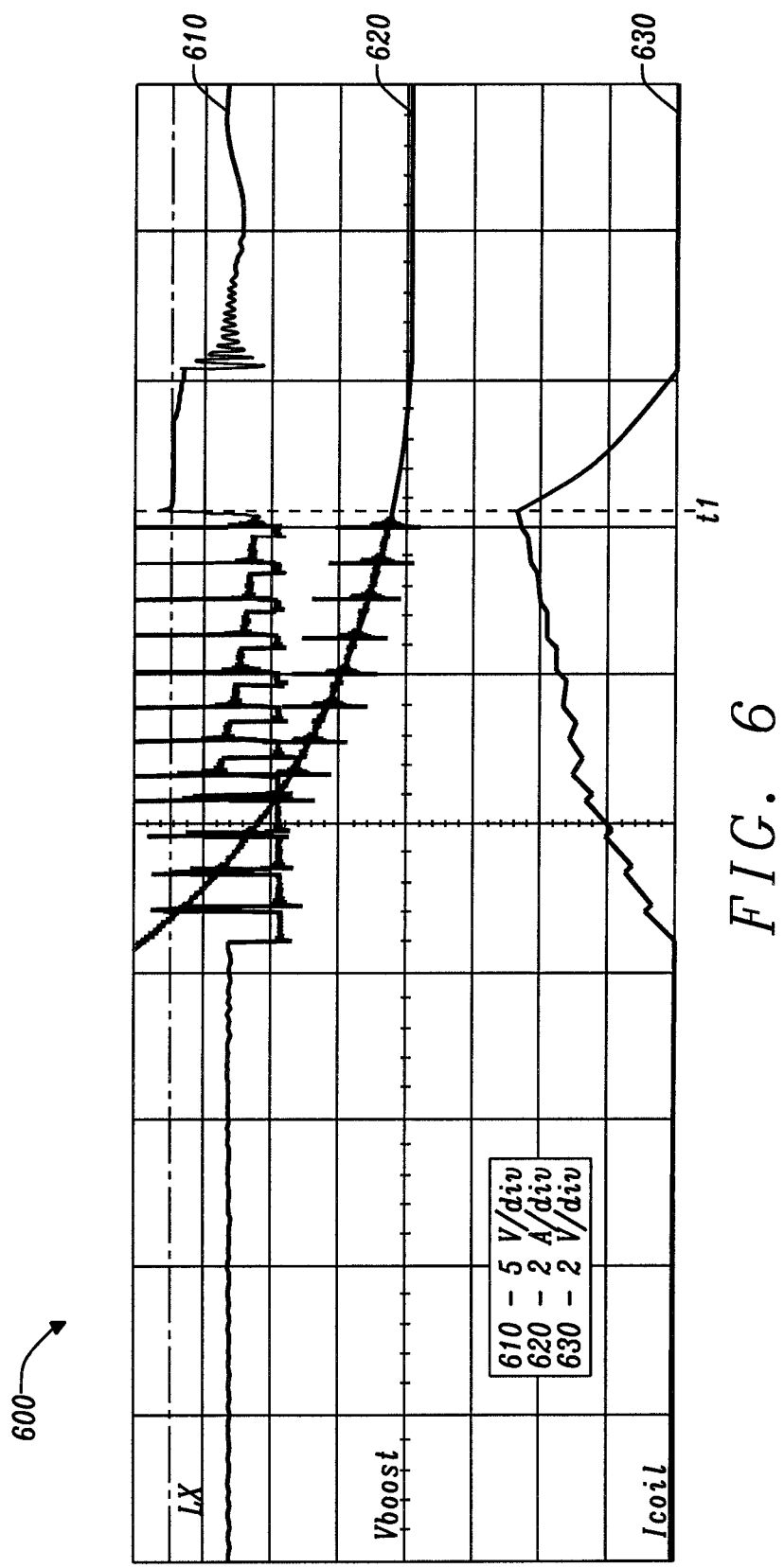
FIG. 6 shows the short circuit protection mechanism working in silicon.

FIG. 6 shows the short circuit protection mechanism working in silicon. The current Icoil 630 builds up, as the output voltage Vboost 620 collapses under the action of a short. As the short is detected at t1, the ISO switch is turned off, and node LX 610 rises, but is clamped by LCAC at approximately 8V. As the LX voltage reaches the activation voltage of LCAC, current Icoil 630 starts flowing. The control loop acts to drive the gate of the Low Side device, such that the LX voltage stays clamped. Coil current Icoil is safely discharged to ground, through the Low Side device.

Figure 7:
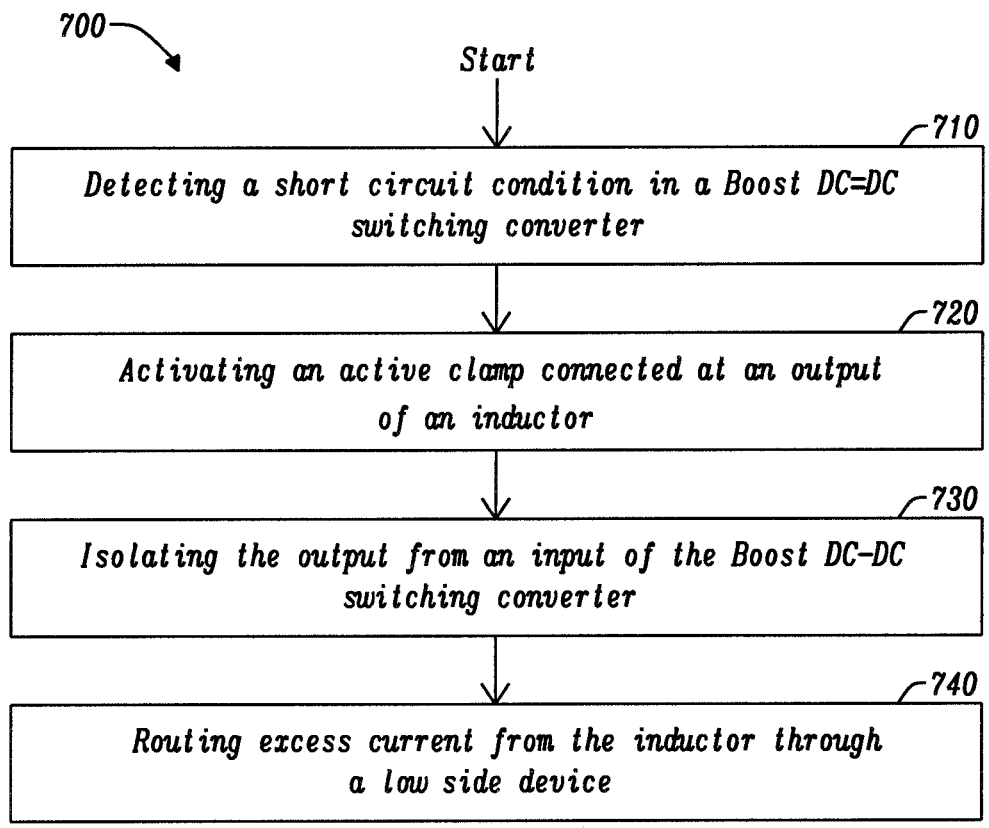
FIG. 7 is a flow chart of the short circuit protection method of the disclosure, in a Boost DC-DC switching converter.

FIG. 7 is flow chart 700 of the short circuit protection method of the disclosure, in a Boost DC-DC switching converter. The steps include 710, detecting a short circuit condition. The steps also include 720, activating an active clamp connected at an output of an inductor. The steps also include 730, isolating the output from an input of the Boost DC-DC switching converter. The steps also include 740, routing excess current from the inductor through a low side device.

The advantages of one or more embodiments of the present disclosure include a short circuit protection circuit and method in a Boost DC-DC switching converter, for both normal and startup operations, that discharges high energy stored in the coil, with no external components and minimum extra silicon area.

While particular embodiments of the present disclosure have been illustrated and described, it will be understood by those skilled in the art that various changes in form and details may be made without departing from the spirit and scope of the invention.

The invention claimed is:

1. A safety protection circuit, for a short circuit to ground, in a Boost DC-DC switching converter, comprising:
   an inductor, high side device and low side device, wherein said inductor is connected at a common node to said high side and low side devices;
   an isolation switch, connected between said high side device and an output of said Boost DC-DC switching converter;
   a gm amplifier, configured to drive a gate of said low side device;
   an active clamp connected between said inductor and said gm amplifier,
   where said active clamp comprises a zener diode and a first and a second resistor, wherein said zener diode is connected between said inductor and said first resistor, and said second resistor is connected between said first resistor and ground;
   short circuit detection logic, configured to activate said active clamp when an output voltage of said Boost DC-DC switching converter falls below a voltage threshold; and
   wherein said safety protection circuit is configured to route excess current from said inductor through said low side device during said short circuit condition.

2. The safety protection circuit of claim 1, further comprising a current sense comparator across said low side device, configured to generate a current limit signal for an on time of said low side device.

3. The safety protection circuit of claim 2, further comprising a voltage sense comparator, with inputs comprising said output voltage of said switching converter and said voltage threshold.

4. The safety protection circuit of claim 3, wherein said short circuit detection logic has inputs from an output of said current sense comparator and an output of said voltage sense comparator, configured to generate a signal that indicates a soft or hard short circuit condition.

5. The safety protection circuit of claim 4, wherein said soft short circuit condition is configured to occur when said output of said switching converter is below said voltage threshold and above an input voltage of said switching converter.

6. The safety protection circuit of claim 4, wherein said active clamp comprises a low current capacity active clamp, controlled by said signal that indicates a soft or hard short circuit condition.

7. The safety protection circuit of claim 6, further comprising a driver at said gate of said low side device, configured to be disabled by said signal that indicates a soft or hard short circuit and put into a tri-state condition.

8. The safety protection circuit of claim 6, wherein said hard short circuit condition is configured to occur when said output of said switching converter falls below said input voltage of said switching converter.

9. The safety protection circuit of claim 6, wherein said low current capacity active clamp is disabled by said signal that indicates a soft or hard short circuit condition.

10. The safety protection circuit of claim 1, wherein said isolation switch is configured to turn off by said signal that indicates a soft or hard short circuit condition.

11. The safety protection circuit of claim 10, wherein said low side device is configured to sink an excess current when said signal that indicates a soft or hard short circuit condition is turned on.

12. The safety protection circuit of claim 1, wherein said short circuit detection logic is configured to activate said active clamp when an output voltage of said switching converter falls below a voltage threshold at a first occurrence, or to wait for a certain number of occurrences to activate.

13. The safety protection circuit of claim 1, wherein a control circuit for said switching converter comprises either asynchronous control or synchronous control.

14. A method for protecting a Boost DC-DC switching converter from a short circuit at its output, comprising the steps of:
    detecting said short circuit;
    activating an active clamp connected at an output of an inductor,
    where said active clamp comprises a zener diode and a first and a second resistor, wherein said zener diode is connected between said inductor and said first resistor, and said second resistor is connected between said first resistor and ground;
    isolating an output of said Boost DC-DC switching converter from an input of said Boost DC-DC switching converter using an isolation switch; and
    routing excess current from said inductor through a low side device.

15. The method of claim 14, further comprising driving a gm amplifier with said active clamp.

16. The method of claim 14 wherein said detecting said short circuit comprises a hard or soft short circuit detection method, further comprising using short circuit detection logic to generate a short circuit signal.

17. The method of claim 16, wherein said hard short circuit detection method comprises determining when said output of said switching converter falls below said input voltage of said switching converter.

18. The method of claim 16, wherein said soft short circuit detection method comprises determining when said output of said switching converter falls below said voltage threshold and above said input voltage of said switching converter.

19. The method of claim 16, wherein said activating an active clamp comprises using said short circuit signal to activate said active clamp, putting a driver at a gate of said low side device into a tri-state condition.

20. The method of claim 16, further comprising providing one input of said short circuit detection logic with a current sense comparator across said low side device, generating a current limit signal for an on time of said low side device.

21. The method of claim 16, further comprising providing one input of said short circuit detection logic with an output of a voltage sense comparator.

22. The method of claim 14, further comprising clamping a node voltage at said output of said inductor at a given voltage.

23. The method of claim 14, wherein said isolating comprises turning off said isolation switch between said input and said output of said Boost DC-DC switching converter.

24. The method of claim 14, wherein said low side device sinks an excess current when said short circuit is detected.

25. The method of claim 14, wherein said active clamp activates when said output voltage of said switching converter falls below a voltage threshold and a current limit triggers at a first occurrence, or waits for a certain number of occurrences and then activates.

\* \* \* \* \*